United States Patent [19]

Krishnan

[11] Patent Number: 5,374,472
[45] Date of Patent: Dec. 20, 1994

[54] FERROMAGNETIC THIN FILMS

[75] Inventor: Kannan M. Krishnan, Berkeley, Calif.

[73] Assignee: The Regents, University of California, Oakland, Calif.

[21] Appl. No.: 177,644

[22] Filed: Jan. 4, 1994

Related U.S. Application Data

[63] Continuation of Ser. No. 971,521, Nov. 3, 1992, abandoned.

[51] Int. Cl.$^5$ .................. B32B 7/02; B32B 9/00; B32B 19/00; G11C 11/00
[52] U.S. Cl. ........................... 428/216; 428/642; 428/649; 428/688; 428/689; 428/692; 428/693; 428/694 R; 428/697; 428/699; 428/212; 427/502; 427/548; 427/549; 365/66; 365/173; 365/158; 117/105; 117/939; 117/954
[58] Field of Search .............. 428/642, 649, 688, 689, 428/692, 693, 694 R, 697, 699, 212, 216; 365/173, 158, 66; 427/502, 548, 549; 148/33.4; 156/611, DIG. 70, DIG. 103

[56] References Cited

U.S. PATENT DOCUMENTS

| | | | |
|---|---|---|---|
| 3,949,387 | 4/1976 | Chaudhari et al. | 365/128 |
| 3,965,463 | 6/1976 | Chaudhari et al. | 365/42 |
| 4,968,564 | 11/1990 | Tada et al. | 428/433 |
| 5,169,485 | 12/1992 | Allen, Jr. et al. | 156/603 |

OTHER PUBLICATIONS

Sands et al., "Epitaxial Ferromagnetic τ-MnAl Films on GaAs", Appl. Phys. Lett. 57(24), Dec. 10, 1990, pp. 2609–2611.
Bither et al. "Magnetic Tetragonal δ Phase in the Mn–Ga Binary", J. Appl. Phys. 36, (1965), pp. 1501–1502.
Cheeks et al. "Magnetic and Magneto-Optic Properties of Epitaxial Ferromagnetic τ-MnAl/(Al,Ga)As Heterostructures", Appl. Phys. lett. 60 (11), Mar. 16, 1992, pp. 1393–1395.

Primary Examiner—William D. Larkins
Assistant Examiner—Alice W. Tang
Attorney, Agent, or Firm—Paul R. Martin; Kathleen S. Moss; Pepi Ross

[57] ABSTRACT

A ferromagnetic $\delta\text{-Mn}_{1-x}\text{Ga}_x$ thin film having perpendicular anisotropy is described which comprises: (a) a GaAs substrate, (b) a layer of undoped GaAs overlying said substrate and bonded thereto having a thickness ranging from about 50 to about 100 nanometers, (c) a layer of $\delta\text{-Mn}_{1-x}\text{Ga}_x$ overlying said layer of undoped GaAs and bonded thereto having a thickness ranging from about 20 to about 30 nanometers, and (d) a layer of GaAs overlying said layer of $\delta\text{-Mn}_{1-x}\text{Ga}_x$ and bonded thereto having a thickness ranging from about 2 to about 5 nanometers, wherein x is 0.4 ±0.05.

10 Claims, 4 Drawing Sheets

FERROMAGNETIC THIN FILMS

This invention was made with Government support under Contract No. DE-AC03-76SF00098 between the U.S. Department of Energy and the University of California for the operation of Lawrence Berkeley Laboratory. The Government has certain rights in this invention.

This is a File-Wrapper-Continuation of patent application Ser. No. 07/971,521, filed Nov. 3, 1992 entitled "Ferromagnetic Thin Films", now abandoned.

BACKGROUND OF THE INVENTION

1. Field of the Invention

The present invention relates to ferromagnetic thin films having perpendicular anisotropy. More particularly, it relates to ferromagnetic thin films utilizing as the ferromagnetic material a Manganese-Gallium compound having the formula $\delta\text{-}Mn_{1-x}Ga_x$, where $X=0.4\pm0.05$. Such thin films are useful in vertical magnetic/magneto-optic recording.

For a ferromagnetic thin film the anisotropy energy includes contributions from surface or interface anisotropy, volume magnetocrystalline anisotropy and the demagnetizing field or shape anisotropy. In general for thick films (~few nm for transition metals), the demagnetizing field is predominant and the magnetization lies in the plane of the film. For ultrathin films and multilayers ($t_m<1$ nm) the surface/interface contribution, proportional to $t_m^{-1}$, can overcome the shape anisotropy and result in a spontaneous magnetization perpendicular to the film. Alternatively, the magnetocrystalline anisotropy can dominate provided the material exhibits strong uniaxial anisotropy and is grown such that the easy axis is oriented along the film normal. The perpendicular anisotropy lends itself to vertical magnetic/magneto-optic recording and epitaxial growth on semiconductor substrates could lead to novel devices.

From a technological point of view, the development of a suitable material for magneto-optic recording imposes a set of stringent requirements that includes perpendicular anisotropy to achieve high bit densities (with vertically magnetized domains), a high coercivity to support micron or sub-micron sized domains, a square hysteresis loop for low writing noise, maximum Kerr rotation angle and optical reflectivity for best magneto-optic signal and a Curie point in the range 180°–300° C. for stable domains with good writing sensitivity. (Materials for magneto-optic data storage, C. J. Robinson, T. Suzuki and C. M. Falco editors, MRS Symposium Proceedings, Vol. 150 (1989).) In addition, it is helpful if the material is corrosion and oxidation resistant, thermally stable and easy to prepare. Finally, epitaxial growth on an appropriate semiconductor substrate with minimal inter-diffusion and interfacial reactions is desired. This would made the exciting possibility of the integration of magneto-optic and semiconducting devices a reality.

2. The Prior Art

Even though a number of thin film materials are being considered and developed none of these materials satisfy all these requirements and each one of the potential candidates has some major deficiency. For example, MnBi exists in two crystallographic phases and the more desirable phase is unstable; amorphous rare earth-transition metal alloys, though most promising, have intrinsically weak magneto-optic activity at wavelengths of interest and the alternative polycrystalline Bi/Ga doped RE-iron garnets have significant grain noise and irregular wall strength.

Ultrathin multilayers (Co/Pt etc.) are currently being developed to overcome some of these limitations by exploiting their surface and interface anisotropy properties. (W. B. Zeper, F. J. A. M. Greidanus, P. F. Carcia and C. R. Fincher, J. Appl. Phys., 65, 4971 (1989).) Being nanostructured materials, they involve complicated processing. In addition, the origin of perpendicular anisotropy in these films is poorly understood and has been variously attributed to interface anisotropy, compound formation at the interface, strain, etc., and this limits further development of this material. (P. Bruno and J.-P. Renard, Appl. Phys., A49, 499 (1989).)

A viable alternative to achieving these goals is to carefully select a ferromagnetic material that in the bulk exhibits uniaxial anisotropy (in addition to the right combination of $T_c$, $H_c$, and saturation magnetization), and grow it epitaxially (good lattice matching is important) on appropriate substrates (preferably on semiconductors for device integration) such that the magnetization is along the film normal. Using this approach, films of $\tau$-MnAl have been grown on GaAs. (T. Sands, J. P. Harbison, M. L. Leadbeater, S. J. Allen, G. W. Hull, R. Ramesh and V. G. Keramidas, Appl. Phys. Lett., 57, 2609 (1090).) Even though they have reported comparable properties there are three major difficulties: (i) the $\tau$-MnAl phase is metastable, (ii) the growth requires deposition of a complex AlAs inter-diffusion barrier and (iii) the properties are optimal for a film thickness of 10nm and deteriorate rapidly above 20nm. (T. L. Cheeks, M. J. S. P. Brasil, T. Sands, J. P. Harbison, D. E. Aspnes and V. G. Keramidas, Appl. Phys. Lett., 60, 1393 (1992).)

I have now discovered that $Mn_{1-x}Ga_x$ $X=0.4\pm0.05$ is the most promising candidate to achieve these stringent mix of properties. In the bulk it is tetragonal (a=2.75 Å, c=3.542 Å) and ferromagnetic ($H_c(77K)=1.15–4.9$ kOe, $T_c=658–748$ K, $\sigma_s$ (77K, 10 kOe)=48–31 G cm$^3$/g). (T. A. Bither and W. H. Cloud, J. Appl. Phys., 36, 1501 (1965).) In addition, growth of the c-axis oriented film on a GaAs (100) substrate for device integration would be both chemically and crystallographically favorable.

IN THE DRAWINGS

FIG. 1 A schematic representation of the simple heterostructure grown by MBE. The films were capped with 5 nm of poly-amorphous GaAs to prevent subsequent oxidation.

FIG. 2 Kerr rotation hysteresis loops with the field applied perpendicular to the films as shown.

FIG. 3 X-ray emissions spectrum from the sample thinned from the back side to remove the GaAs substrate. However, the capping layer was in place and the final composition of the film was calculated by making appropriate corrections.

FIGS. 4(a)–4(d) X-ray scattering results: a) portion of the Θ-2Θ scan corresponding to the (002) reflection of the δ-phase, b) rocking scan around the (002) peak shows a FWHM ~2 degrees, c) portion of the Θ-2Θ scan corresponding to the (200) reflection f the δ-phase, d) rocking scan around the (200) peak showing extremely good in-plane order of the films.

SUMMARY OF THE INVENTION

It is an object of this invention to provide a composite material having a ferromagnetic thin film deposited on a substrate in a manner such that the anisotropy is perpendicular, i.e., the magnetization is vertical relative to the surface of the substrate.

It is a further object of this invention to provide a composite material suitable for magneto-optical recording.

Other objects will be apparent from the description to follow.

The present invention is a ferromagnetic composite comprising a substrate having a ferromagnetic thin film deposited on the surface thereof and bound thereto, wherein said thin film has perpendicular anisotropy relative to the surface of said substrate.

Preferably, the composite comprises a ferromagnetic thin film of $\tau$-$Mn_{1-x}Ga_x$ epitaxially grown on a GaAs substrate wherein x is $0.4\pm0.05$.

The invention also comprises the method of making the composite.

DETAILED DESCRIPTION OF THE INVENTION

Figure 1:
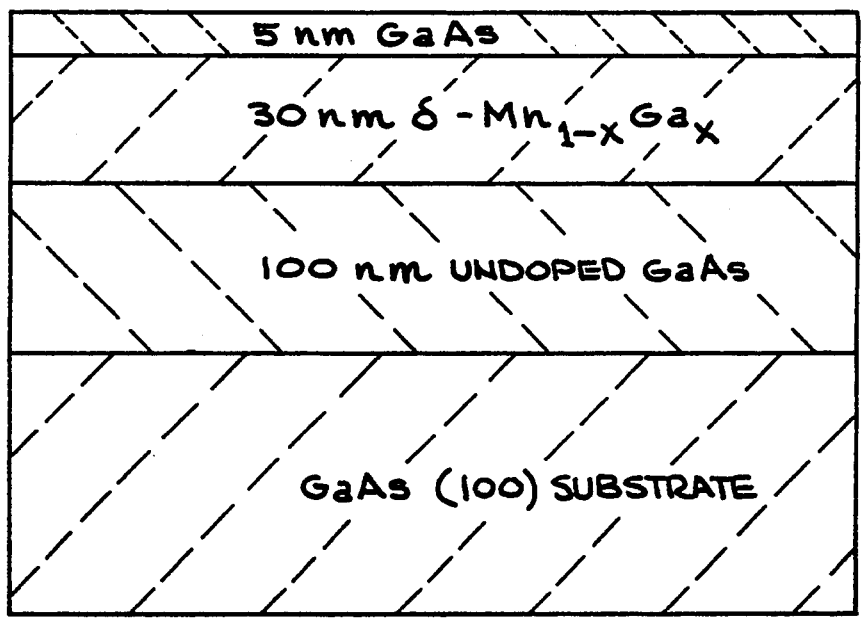
Figure 2:
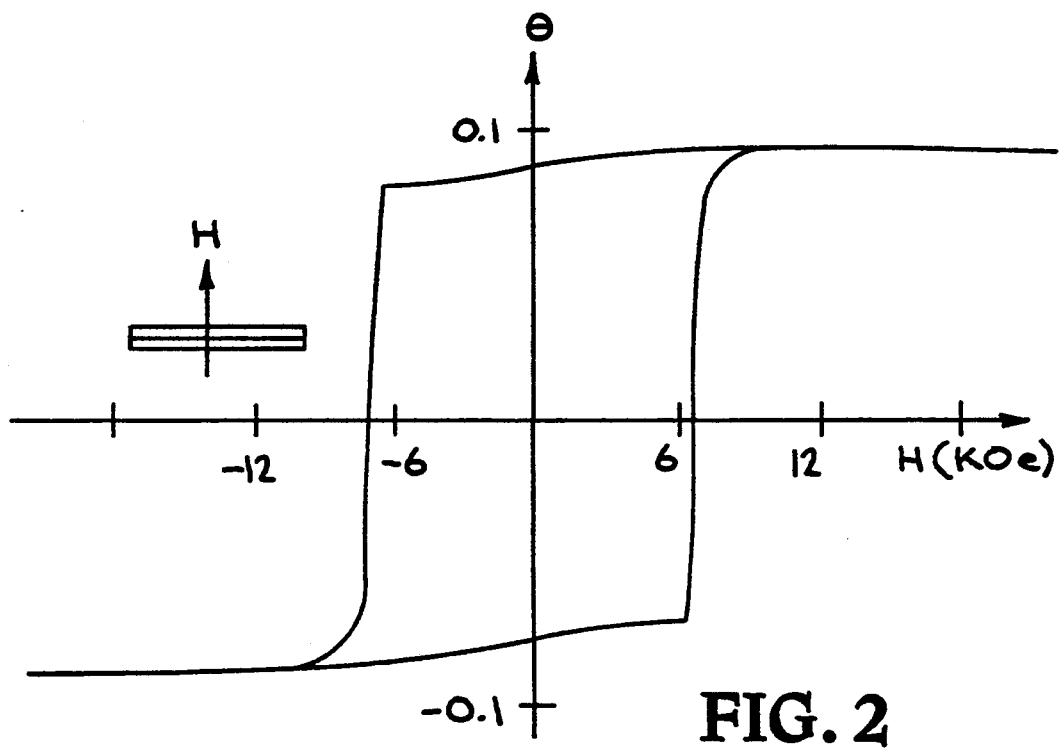

Thin films were grown by routine molecular beam epitaxy methods, i.e., J. P. Harbison, T. Sands, R. Ramesh, L. T. Florez, B. J. Wilkens and V. G. Keramidas, J. Cryst. Growth, 111, 978 (1991) incorporated by reference herein. Films with a composition $Mn_{1-x}Ga_x$ (x=0.4) were grown at a substrate temperature of 100° C. (FIG. 1). The polar Kerr rotation data is shown in FIG. 2. The field was applied perpendicular to the film and a red laser (820 nm) was used. It is clear from the square loop that the magnetization is along the film normal. The Kerr rotation angle was ~0.1 degrees and the coercivity was ~6 kOe. Optical reflectivity was measured over a range of wavelengths ranging from the ultra-violet to the far infrared. The reflectivity of the film is uniformly around 65–70%. A small dip in reflectivity around $\lambda=0.5$ microns was observed and this was interpreted as arising from the enhanced reflectivity of the 5nm GaAs capping layer at these wavelengths. (J. I. Pankove, Optical processes in semiconductors, Dover, N.Y., p. 56, (1971).) In principle this effect can be eliminated by reducing the thickness of the capping layer. The combination of the reflectivity and Kerr rotation data makes this a very promising material for magneto-optic recording.

Figure 3:
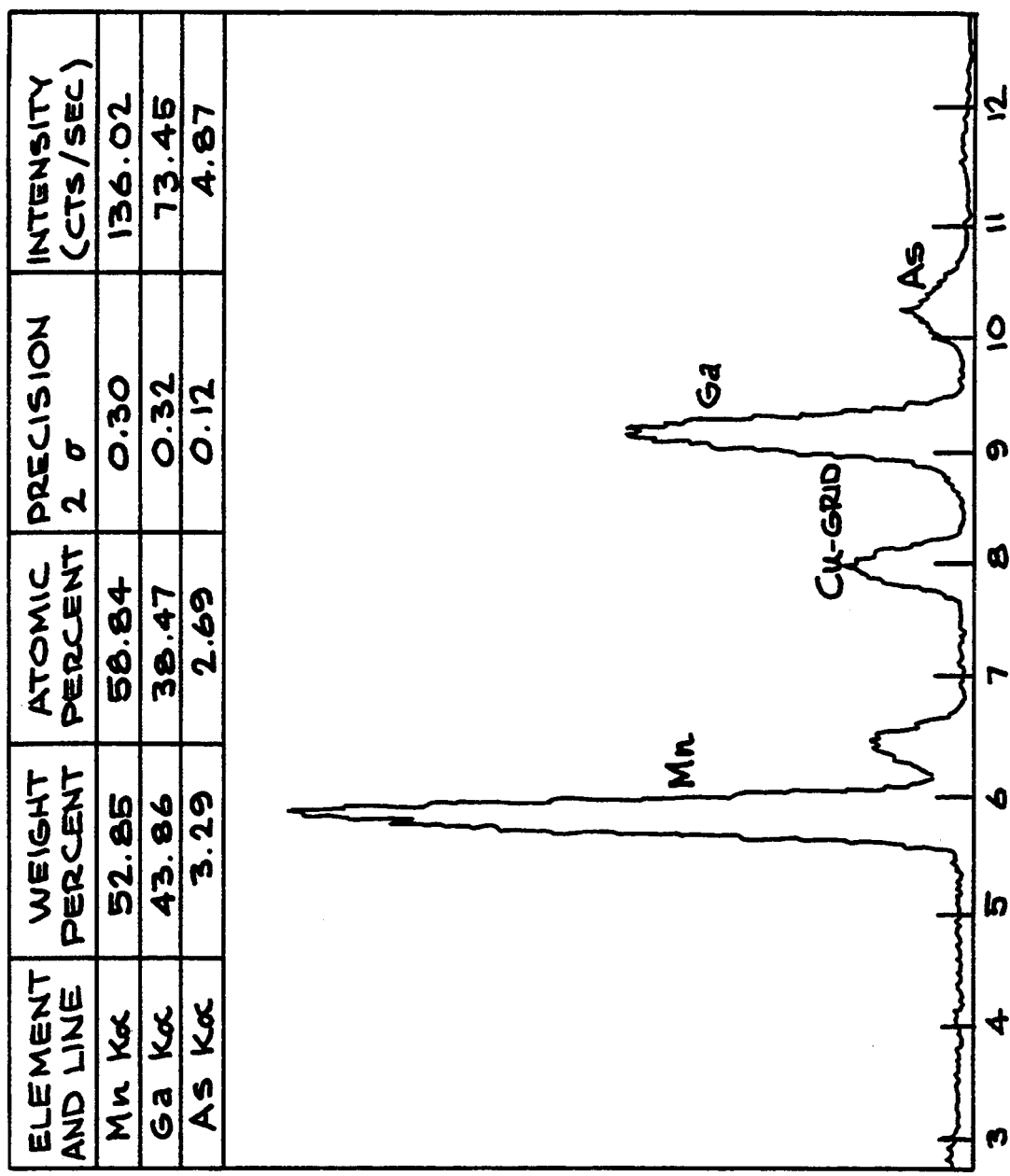
Figure 4A:
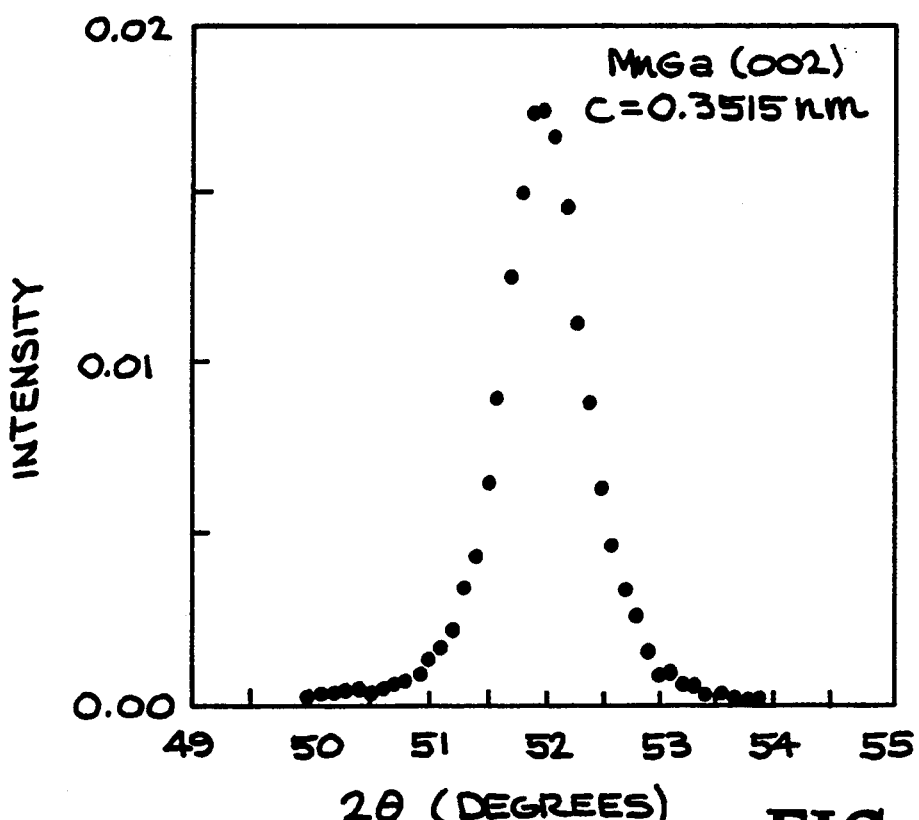
Figure 4B:
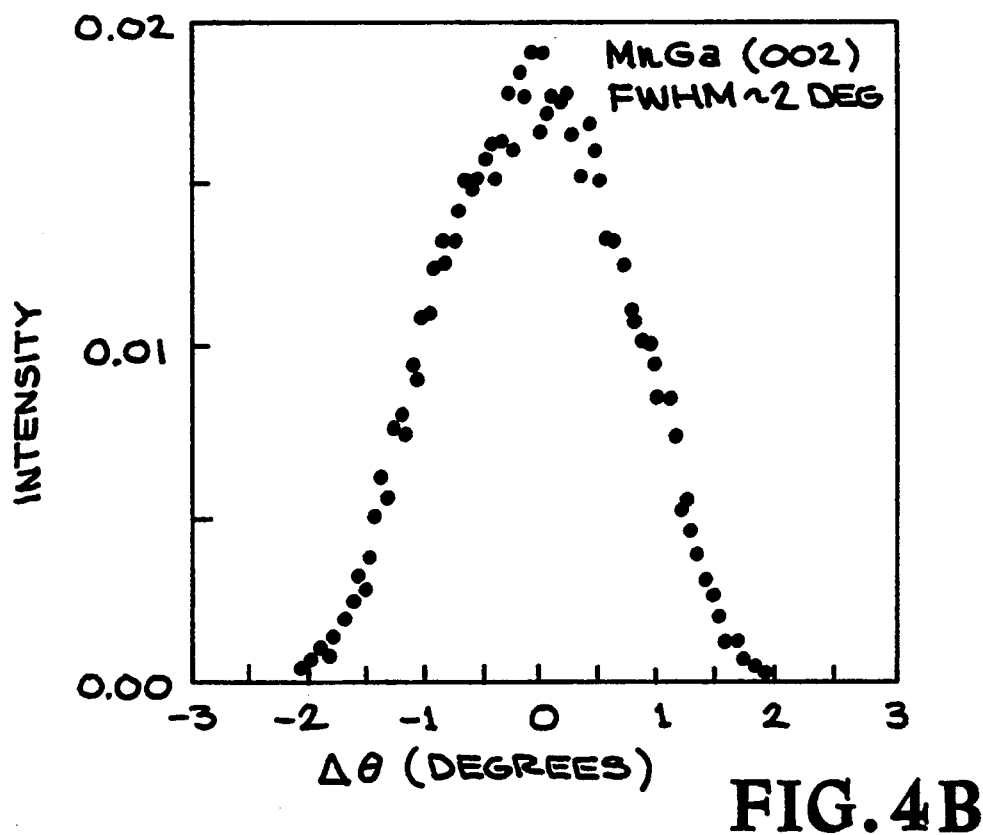
Figure 4C:
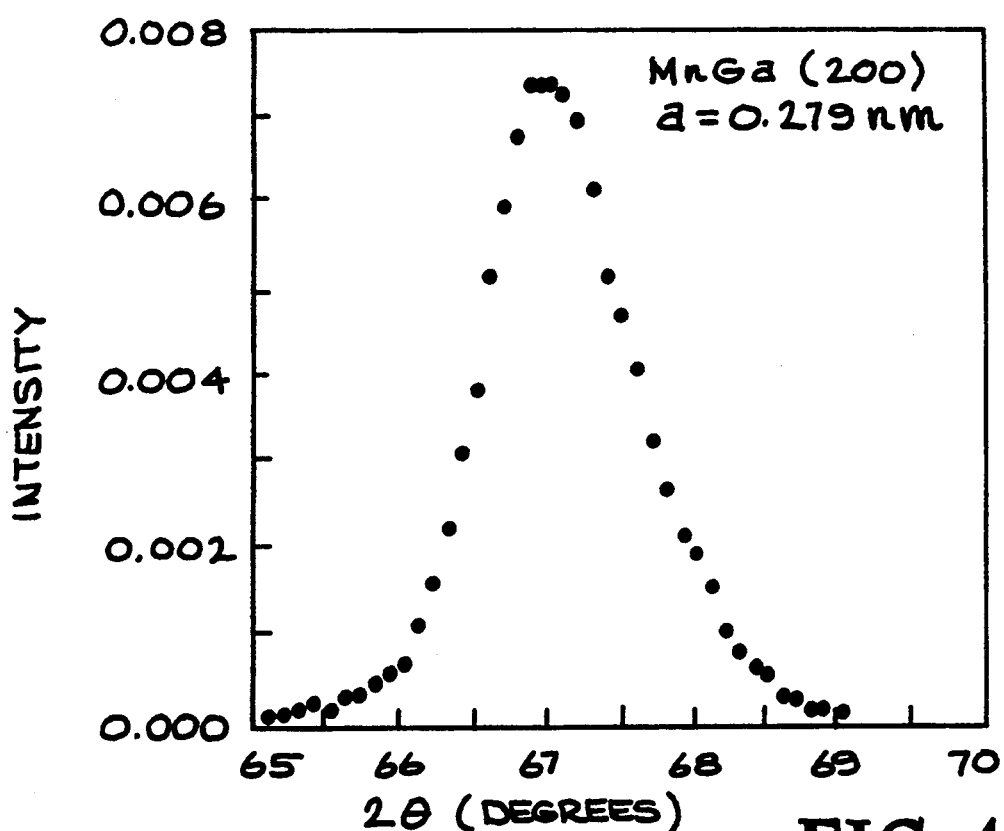
Figure 4D:
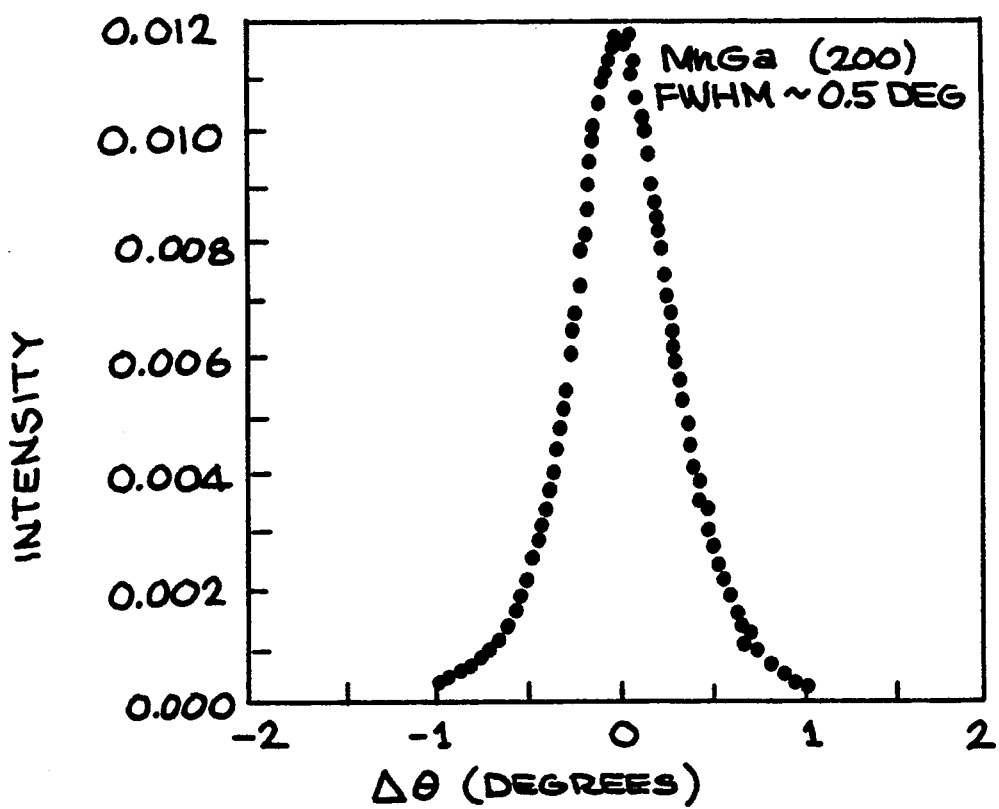

X-ray emission spectroscopy from a thin foil of the film, thinned from the back side to remove the GaAs substrate, using an energy dispersive x-ray detector with an energy resolution of 155 eV for MnK $\alpha$, gave the overall composition of the film as 58.84% Mn, 38.47% Ga and 2.69% As (FIG. 3). Correcting for the effect of the capping layer the nominal composition of the film is then $38.0\pm2.0\%$ Ga and $62\pm2.0\%$ Mn, in good agreement with the expected structure from the calibrated MBE deposition rates. Structural characterization of the material carried out by x-ray diffraction and transmission electron microscopy confirmed that the unit cell of the film is tetragonal with a=0.279 nm and c=0.3515 nm. $\Theta 2\Theta$ scans and corresponding rocking measurements with the film normal in the scattering plane gave c=3,515 Å and a spread of the (002) $Mn_xGa_{1-x}$ peak of about 2.0 degrees. Grazing incident x-ray diffraction measurements, with the film normal perpendicular to the scattering plane, gave an in-plane lattice spacing a=2.79 Å and the corresponding $\phi$ scans reveal an in-plane order of 0.5 degrees. It is clear that these films can be grown epitaxially on such compound semiconductor substrates. More detailed characterization is required to investigate whether the 1.24% difference in lattice parameter is accommodated by interfacial defects or by an overall strain in the film. High resolution electron microscopy experiments to elucidate these structural details are in progress.

Magnetic properties of the films were also measured by a SQUID magnetometer (at 35 K) and a vibrating sample magnetometer at room temperature. Separate measurement for a GaAs wafer was carried out and subtracted from the data for the film to eliminate substrate effects. The B-H loop is square (for the field applied along the film normal) with a coercivity of 6.2 kOe and a saturation magnetization 0.00035 emu. For the measured film, this translates into a saturation magnetization of 748.5 G $cm^3/g$ or 460 $emu/cm^3$.

The essence of the invention lies in the deposition of a thin film material having a tetragonal unit cell with strong magnetocrystalline anisotropy bonded to an appropriate substrate with the c-axis normal to the plane of the film such that perpendicular anisotropy is achieved. The choice of substrate, in particular the matching of its lattice parameter to that of the film, is important for epitaxial growth. In the case of Gallium Arsenide it is sometimes desirable to interpose a thin film coating over the substrate between the substrate and the ferromagnetic thin film. Thus, as seen in FIG. 1, an epitaxially grown coating of undoped GaAs is deposited on the substrate surface. This smooths out the surface of the substrate and enables tighter bonding of the ferromagnetic thin film to the surface of the substrate than would otherwise be the case.

In a like manner, the ferromagnetic thin film can also have an optional coating of protective material on top of it. This is also exemplified in FIG. 3 wherein a Gallium-Arsenide coating is applied over the ferromagnetic thin film.

In summary, a new thin film ferromagnetic material with perpendicular anisotropy, a tetragonal unit cell with good epitaxy on GaAs (100), reasonable coercivity and saturation magnetization, good Kerr rotation and optical reflectivity, thermodynamically stable and easy to synthesize directly on GaAS without the use of an intermediate inter-diffusion barrier has been discovered.

I claim:

1. A thermodynamically stable ferromagnetic $\delta$-$Mn_{1-x}Ga_x$ thin film having perpendicular anisotropy which comprises
   (a) a GaAs substrate,
   (b) a layer of undoped GaAs overlying said substrate and bonded thereto having a thickness ranging from about 50 to about 100 nanometers,
   (c) a layer of $\delta$-$Mn_{1-x}Ga_x$ overlying said layer of undoped GaAs and bonded thereto having a thickness ranging from about 20 to about 30 nanometers, and
   (d) a layer of GaAs overlying said layer of $\delta$-$Mn_{1-x}Ga_x$ and bonded thereto having a thickness ranging from about 2 to about 5 nanometers, wherein x is a $0.4\pm0.05$.

2. The film of claim 1, wherein the layer of (b) is 100 nm thick.

3. The film of claim 1, wherein the layer of (c) is 30 nm thick.

4. The film of claim 1, wherein the layer of (d) is 5 nm thick.

5. The film of claim 1, wherein x is 0.4.

6. The method for the preparation of a thermodynamically stable ferromagnetic thin film which comprises (a) providing a GaAs substrate,
(b) depositing a layer of undoped GaAs overlying said substrate and bonded thereto having a thickness ranging from about 50 to about 100 nanometers,
(c) depositing a layer of $\delta\text{-Mn}_{1-x}\text{Ga}_x$ overlying said layer of undoped GaAs and bounded thereto having a thickness ranging from about 20 to about 30 nanometers, and
(d) depositing a layer of GaAs overlying said layer of $\delta\text{-Mn}_{1-x}\text{Ga}_x$ and bonded thereto having a thickness ranging from about 2 to about 3 nanometers, wherein x is a $0.4\pm0.05$.

7. The method of claim 6, wherein the layer of (b) is 100 nm thick.

8. The method of claim 6, wherein the layer of (c) is 300 nm thick.

9. The method of claim 6, wherein the layer of (d) is 5 nm thick.

10. The method of claim 6, wherein x is 0.4.

* * * * *